US012764055B2

(12) United States Patent
Qiu

(10) Patent No.: US 12,764,055 B2
(45) Date of Patent: Oct. 13, 2026

(54) MULTICAST FORWARDING METHODS AND APPARATUSES ACROSS AUTONOMOUS SYSTEMS

(71) Applicant: NEW H3C TECHNOLOGIES CO., LTD., Zhejiang (CN)

(72) Inventor: Yuanxiang Qiu, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 382 days.

(21) Appl. No.: 18/567,547

(22) PCT Filed: Dec. 14, 2021

(86) PCT No.: PCT/CN2021/137664
§ 371 (c)(1),
(2) Date: Dec. 6, 2023

(87) PCT Pub. No.: WO2023/108381
PCT Pub. Date: Jun. 22, 2023

(65) Prior Publication Data

US 2024/0275714 A1 Aug. 15, 2024

(51) Int. Cl.
*H04L 45/02* (2022.01)
*H04L 45/16* (2022.01)

(52) U.S. Cl.
CPC .................................... *H04L 45/16* (2013.01)

(58) Field of Classification Search
None
See application file for complete search history.

(56) References Cited

U.S. PATENT DOCUMENTS

2019/0297000 A1 9/2019 Dutta
2020/0245206 A1 7/2020 Allan
(Continued)

FOREIGN PATENT DOCUMENTS

CN 109150730 A 1/2019
CN 110784411 A 2/2020
(Continued)

OTHER PUBLICATIONS

European Patent Office, Extended European Search Report Issued in Application No. 21967523.8, dated Jul. 15, 2024, Germany, 14 pages.
ISA State Intellectual Property Office of the People's Republic of China, Written Opinion of the International Searching Authority Issued in Application No. PCT/CN2021/137664, Aug. 31, 2022, WIPO, 6 pages.
(Continued)

*Primary Examiner* — Minh Trang T Nguyen
(74) *Attorney, Agent, or Firm* — GREENBLUM & BERNSTEIN, P.L.C.

(57) ABSTRACT

A multicast forwarding method comprises: establishing, by a network device, BIER multicast forwarding information for joining a target multicast group according to a multicast join packet initiated by a multicast receiver connected to a second edge node in a second AS, the second edge node serving as a BFER in a second BIER domain, the target multicast group being a multicast group to which a multicast source connected to a first edge node in a first AS belongs, and the first edge node serving as a BFIR in a first BIER domain; and modifying a BFR ID of the second edge node carried in the multicast join packet into a first BFR ID, and continuing to send the multicast join packet to the first edge node, wherein the first BFR ID is a BFR ID configured when the network device is deployed as the BFER in the first BIER domain.

13 Claims, 3 Drawing Sheets

(56) References Cited

U.S. PATENT DOCUMENTS

| | | | | |
|---|---|---|---|---|
| 2020/0412562 | A1* | 12/2020 | Peng | H04L 45/16 |
| 2021/0058260 | A1* | 2/2021 | Xia | H04L 12/4633 |
| 2021/0320929 | A1* | 10/2021 | Xie | H04L 12/4633 |
| 2023/0246947 | A1* | 8/2023 | Zhang | H04L 41/12 370/254 |
| 2024/0243990 | A1* | 7/2024 | Ye | H04L 45/16 |

FOREIGN PATENT DOCUMENTS

| | | | |
|---|---|---|---|
| CN | 112511444 | A | 3/2021 |
| EP | 3896923 | A1 | 10/2021 |
| JP | 2021-522745 | | 8/2021 |
| WO | 2021036482 | A1 | 3/2021 |
| WO | 2021196717 | A1 | 10/2021 |

OTHER PUBLICATIONS

ISA State Intellectual Property Office of the People's Republic of China, International Search Report Issued in Application No. PCT/CN2021/137664, Aug. 31, 2022, WIPO, 4 pages.

IJ.Wijnands, Ed et al. "Multicast Using Bit Index Explicit Replication-draft-ietf-bier-architecture-08", https://datatracker.ietf.org/doc/pdf/draft-ietf-bier-architecture-08, Jun. 5, 2018, 43 pages.

State Intellectual Property Office of the People's Republic of China, Office Action and Search Report Issued in Application No. 202180003943.8, Jun. 17, 2025, 10 pages, with English translation.

L. Geng et al., "Inter-Domain Multicast Deployment using BIERv6 draft-geng-bier-ipv6-inter-domain-02", Oct. 27, 2020, 11 pages.

* cited by examiner

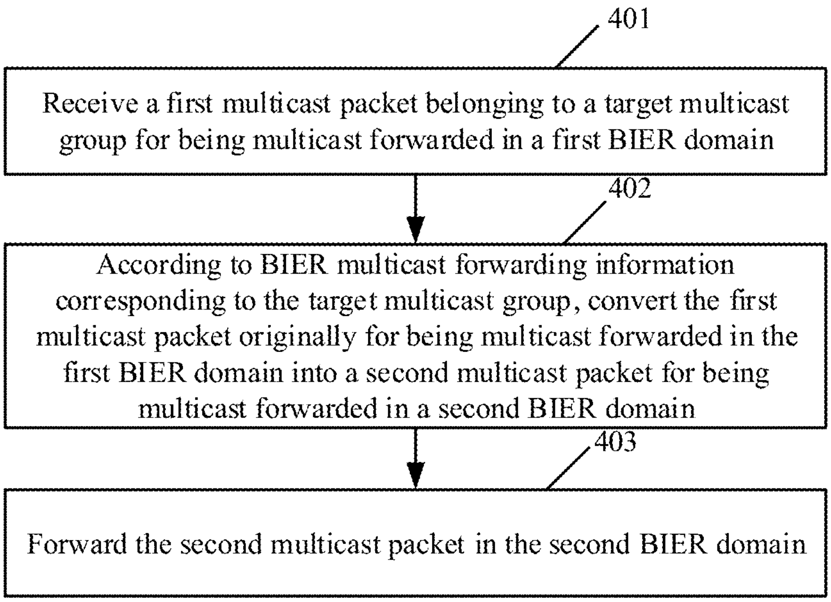
FIG. 4
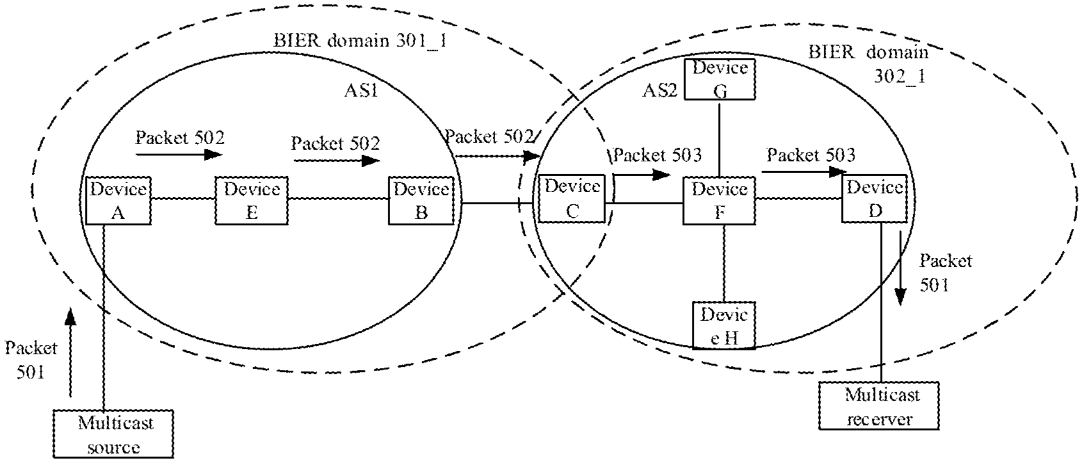
FIG. 5
| | | |
|---|---|---|
| Version | Traffic Class | Flow Label |
| Payload Length | Next Header = 60(DO) | Hop Limit |
| Source Address | | |
| Destination Address | | |
FIG. 6

MULTICAST FORWARDING METHODS AND APPARATUSES ACROSS AUTONOMOUS SYSTEMS

CROSS REFERENCE TO RELATED APPLICATIONS

This application is a National Stage of International Application No. PCT/CN2021/137664, filed on Dec. 14, 2021, the disclosure of which is incorporated herein by reference in its entirety for all purposes.

TECHNICAL DOMAIN

The present application relates to network communication technology, and in particular, to multicast forwarding methods and apparatuses across Autonomous Systems (ASs).

BACKGROUND

During deployment of Bit Indexed Explicit Replication (BIER) across ASs, multicast forwarding in a same AS is limited to forwarding in a corresponding operator's autonomous domain (abbreviated as a BIER domain).

SUMMARY

In embodiments of the present application, there are provided multicast forwarding methods and apparatuses across Autonomous Systems (ASs), so as to solve the problem that occurs during the multicast forwarding across ASs due to BFR ID conflicts in different BIER domains.

In the embodiments of the present application, there is provided a multicast forwarding method across Autonomous Systems (ASs), where the method is applied to a network device, the network device is deployed as both a Bit Forwarding Egress Router (BFER) in a first BIER domain and a Bit Forwarding Ingress Router (BFIR) in a second BIER domain, the first BIER domain is a BIER domain to which a first AS belongs, the second BIER domain is a BIER domain to which a second AS belongs, and the network device is located in the second AS: the method includes:

- establishing, according to a multicast join packet initiated by a multicast receiver, BIER multicast forwarding information for being multicast forwarded in the second BIER domain, where the multicast receiver is connected to a second edge node in the second AS, the second edge node serves as a BFER in the second BIER domain, the multicast join packet is used to join a target multicast group, the target multicast group is a multicast group to which a multicast source connected to a first edge node in the first AS belongs, and the first edge node serves as a BFIR in the first BIER domain; and
- modifying a Bit Forwarding Router Identifier (BFR ID) of the second edge node carried in the multicast join packet into a first BFR ID, and continuing to send the multicast join packet to the first edge node, where the first BFR ID is a BFR ID configured when the network device is deployed as the BFER in the first BIER domain.

In the embodiments of the present application, there is further provided a multicast forwarding method across Autonomous Systems (ASs), where the method is applied to a network device, the network device is deployed as both a Bit Forwarding Egress Router (BFER) in a first BIER domain and a Bit Forwarding Ingress Router (BFIR) in a second BIER domain, the first BIER domain is a BIER domain to which a first AS belongs, the second BIER domain is a BIER domain to which a second AS belongs, and the network device is located in the second AS: the method includes:

- receiving a first multicast packet belonging to a target multicast group for being multicast forwarded in the first BIER domain, where the first multicast packet is from a multicast source connected to a first edge node in the first AS, the first edge node serves as a BFIR in the first BIER domain, and the target multicast group is a multicast group to which the multicast source belongs;
- converting. according to BIER multicast forwarding information corresponding to the target multicast group, the first multicast packet originally for being multicast forwarded in the first BIER domain into a second multicast packet for being multicast forwarded in the second BIER domain, where the BIER multicast forwarding information is established according to a multicast join packet initiated by a multicast receiver connected to each edge node in the second BIER domain when joining the target multicast group; and
- forwarding the second multicast packet in the second BIER domain.

In the embodiments of the present application, there is further provided a multicast forwarding apparatus across Autonomous Systems (ASs), where the method is applied to a network device, the network device is deployed as both a Bit Forwarding Egress Router (BFER) in a first BIER domain and a Bit Forwarding Ingress Router (BFIR) in a second BIER domain, the first BIER domain is a BIER domain to which a first AS belongs, the second BIER domain is a BIER domain to which a second AS belongs, and the network device is located in the second AS: the apparatus includes:

- a forwarding information establishing unit, configured to establish, according to a multicast join packet initiated by a multicast receiver. BIER multicast forwarding information for being multicast forwarded in the second BIER domain, where the multicast receiver is connected to a second edge node in the second AS, the second edge node serves as a BFER in the second BIER domain, the multicast join packet is used to join a target multicast group, the target multicast group is a multicast group to which a multicast source connected to a first edge node in the first AS belongs, and the first edge node serves as a BFIR in the first BIER domain; and
- a first packet forwarding unit, configured to modify a Bit Forwarding Router Identifier (BFR ID) of the second edge node carried in the multicast join packet into a first BFR ID, and continue to send the multicast join packet to the first edge node, where the first BFR ID is a BFR ID configured when the network device is deployed as the BFER in the first BIER domain.

In the embodiments of the present application, there is further provided a multicast forwarding apparatus across Autonomous Systems (ASs), where the method is applied to a network device, the network device is deployed as both a Bit Forwarding Egress Router (BFER) in a first BIER domain and a Bit Forwarding Ingress Router (BFIR) in a second BIER domain, the first BIER domain is a BIER domain to which a first AS belongs, the second BIER domain is a BIER domain to which a second AS belongs, and the network device is located in the second AS: the apparatus includes:

- a multicast packet receiving unit, configured to receive a first multicast packet belonging to a target multicast group for being multicast forwarded in the first BIER domain, where the first multicast packet is from a multicast source connected to a first edge node in the first AS, the first edge node serves as a BFIR in the first BIER domain, and the target multicast group is a multicast group to which the multicast source belongs;

a multicast packet converting unit, configured to convert, according to BIER multicast forwarding information corresponding to the target multicast group, the first multicast packet originally for being multicast forwarded in the first BIER domain into a second multicast packet for being multicast forwarded in the second BIER domain, where the BIER multicast forwarding information is established according to a multicast join packet initiated by a multicast receiver connected to each edge node in the second BIER domain when joining the target multicast group; and a second packet forwarding unit, configured to forward the second multicast packet in the second BIER domain.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 4 is a flowchart illustrating another method according to an embodiment of the present application.

FIG. 5 is a schematic diagram illustrating multicast packet forwarding according to an embodiment of the present application.

FIG. 6 is a schematic structural diagram illustrating an IPv6 basic packet header according to an embodiment of the present application.

DETAILED DESCRIPTION OF THE EMBODIMENTS

Figure 1:
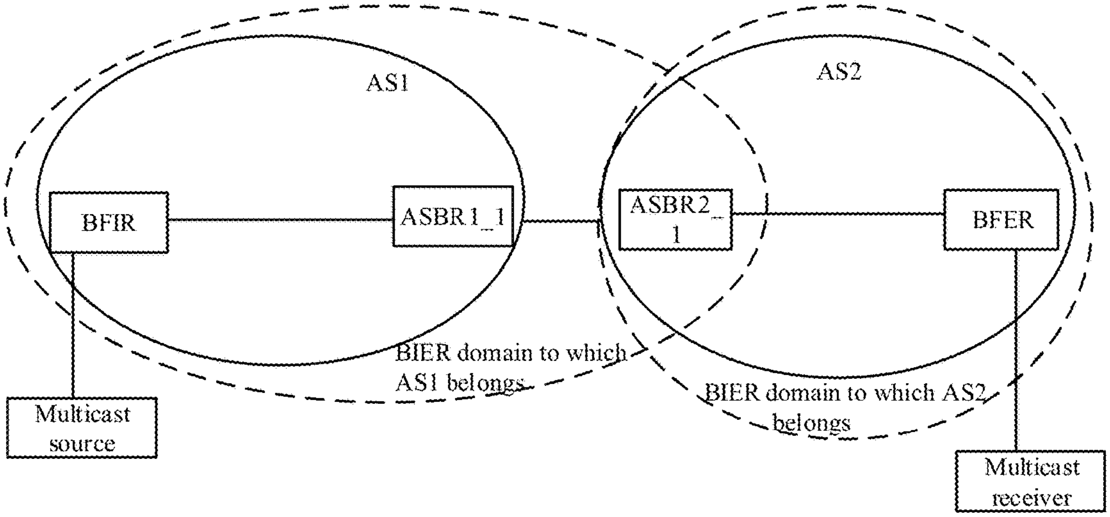
FIG. 1 is a schematic diagram illustrating a network structure according to an embodiment of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

The terms used in the present application are for the purpose of describing particular examples only; and are not intended to limit the present application. Terms determined by "a". "the" and "said" in their singular forms in the present application and the appended claims are also intended to include plurality, unless clearly indicated otherwise in the context.

In order to enable those skilled in the art to better understand the technical solutions provided by the embodiments of the present application, and make the objects, features and advantages of the embodiments of the present application more apparent, the technical solutions in the embodiments of the present application will be described in further detail below with reference to the accompanying drawings.

With continuous development of multicast services, currently, there is often a need for multicast forwarding across ASs. As mentioned above, each AS is deployed with a corresponding BIER domain, and the "across ASs" here can be referred to as "across BIER domains". However, since identifiers (IDs) of bit forwarding routers (BFRs) of edge devices in different ASs have been pre-configured, during the multicast forwarding across ASs, it often occurs that different devices in different ASs are configured with a same BFR ID, that is, a BFR ID conflict problem occurs during the multicast forwarding across ASs. The BFR ID conflict problem that occurs during the multicast forwarding across ASs will affect the multicast forwarding across ASs.

In the embodiments of the present application, a BIER hierarchical forwarding framework is constructed in order to implement multicast forwarding across ASs. Taking a BIER two-level forwarding framework as an example, the BIER two-level forwarding framework can be: deploying at least one Autonomous System Border Router (ASBR) as both a Bit Forwarding Egress Router (BFER) in a BIER domain to which an AS belongs and a Bit Forwarding Ingress Router (BFIR) in a BIER domain to which another AS belongs. Corresponding to the BIER two-level forwarding framework, the ASBR can be used as a BIER hierarchical forwarding device. As shown in FIG. 1. ASBR2_1, serving as a BIER hierarchical forwarding device, is deployed as both a BFER in a BIER domain to which AS1 belongs and a BFIR in a BIER domain to which AS2 belongs. If a multicast receiver connected to AS2 requires to receive multicast packets from a multicast source connected to AS1, based on the above deployment. ASBR2_1 may forward the multicast packets initiated by the multicast source to the multicast receiver connected to AS2. A method according to an embodiment of the present application will be described below with reference to FIG. 2.

Figure 2:
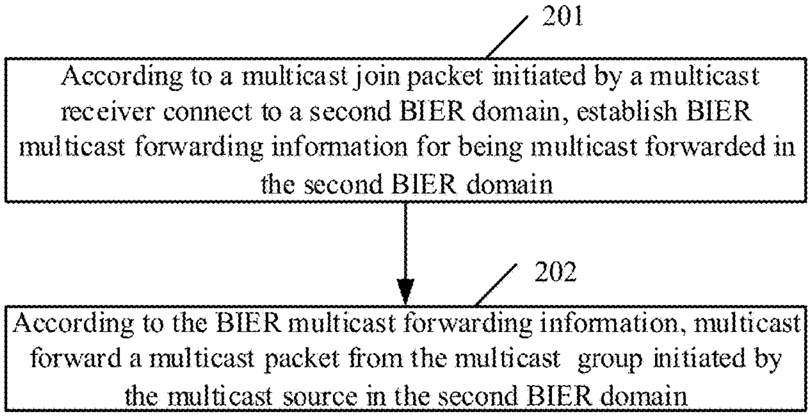
FIG. 2 is a flowchart illustrating a method according to an embodiment of the present application.

FIG. 2 is a flowchart illustrating a method according to an embodiment of the present application. This method is applied to a network device. The network device here is deployed as both a BFER in a first BIER domain and a BFIR in a second BIER domain. It should be noted that the first BIER domain and the second BIER domain here are named only for convenience of description, and not for limitation.

In some examples, in this embodiment, the first BIER domain and the second BIER domain are BIER domains to which different ASs belong. For example, the first BIER domain is a BIER domain to which a first AS belongs, and the second BIER domain is a BIER domain to which a second AS belongs. In this embodiment, the network device is located in the second AS.

As shown in FIG. 2, the method may include the following steps:

At step 201, according to a multicast join packet initiated by a multicast receiver. BIER multicast forwarding information for being multicast forwarded in a second BIER domain is established.

In this embodiment, the multicast receiver is connected to an edge node (denoted as a second edge node) in the second AS. Here, the second edge node serves as a BFER in the second BIER domain.

In this embodiment, the multicast join packet is used to join a target multicast group. Here, the target multicast group is a multicast group to which a multicast source connected to an edge node (denoted as a first edge node) in the first AS belongs. In this embodiment, the first edge node serves as a BFIR in the first BIER domain.

In some examples, in this embodiment, a multicast receiver connected to any edge node in the second BIER domain, when desiring to join the target multicast group, may send a multicast join packet. The edge node connected to the multicast receiver in the second BIER domain may receive the multicast join packet, and continue to forward the multicast join packet, and finally the multicast join packet may be forwarded to the network device in the second BIER domain. The network device, when receiving the multicast join packet, may establish the BIER multicast forwarding information for being multicast forwarded in the second BIER domain according to the received multicast join packet. That is, according to the multicast join packet initiated by the multicast receiver, establishing, by the network device, the BIER multicast forwarding information for being multicast forwarded in the second BIER domain in step 201 is implemented.

In some examples, in this embodiment, the BIER multicast forwarding information corresponds to the target multicast group, and can include at least: a BFR ID configured for the second edge node connected to the multicast receiver in the second BIER domain, and a next-hop neighbor for reaching the second edge node. How to establish the BIER multicast forwarding information will be exemplified below with reference to FIG. 3, and will not be repeated here.

At step 202, a BFR ID of a second edge node carried in the multicast join packet is modified into a first BFR ID, and the multicast join packet continues to be sent to a first edge node, where the first BFR ID is a BFR ID configured when a network device is deployed as a BFER in a first BIER domain.

In this embodiment, the network device, serving as the BFER in the first BIER domain, may send, according to learned route information from the network device to the multicast source, the multicast join packet to a next hop in the route information. As described in step 202, the multicast join packet may no longer carry the BFR ID of the second edge node in the second BIER domain, but replace the BFR ID with the first BFR ID. In this embodiment, the multicast join packet may continue to carry multicast source S and multicast group G Finally, the first edge node in the first BIER domain may receive the multicast join packet.

In some examples, in this embodiment, the first edge node, when receiving the multicast join packet from the network device, may establish a relationship between (multicast source S and multicast group G) and the first BFR ID. Then, the first edge node, when receiving a multicast packet belonging to multicast group G from multicast source S, may send the multicast packet to the network device according to the established relationship between (multicast source S and multicast group G) and the first BFR ID. For details, reference may be made to multicast packet forwarding shown in FIG. 4 or FIG. 5, which will not be repeated here.

So far, the description for processes shown in FIG. 2 is completed.

As can be seen from the processes shown in FIG. 2, in this embodiment, hierarchical BIER, that is, a BFER in a first BIER domain and a BFIR in a second BIER domain, is deployed on an ASBR in an AS, and the ASBR establishes, according to a multicast join packet initiated by a multicast receiver connected to an edge node in a second AS. BIER multicast forwarding information for being multicast forwarded in the second BIER domain, so as to convert a multicast packet from the first BIER domain and forward the converted multicast packet in the second BIER domain, which solves the problem that occurs during the multicast forwarding across ASs due to BFR ID conflicts in different BIER domains.

Further, in this embodiment, multicast forwarding across ASs can be implemented merely by simply modifying or upgrading an ASBR in an AS, which has no impact on original multicast services or other devices, and makes it easy to expand.

Figure 3:
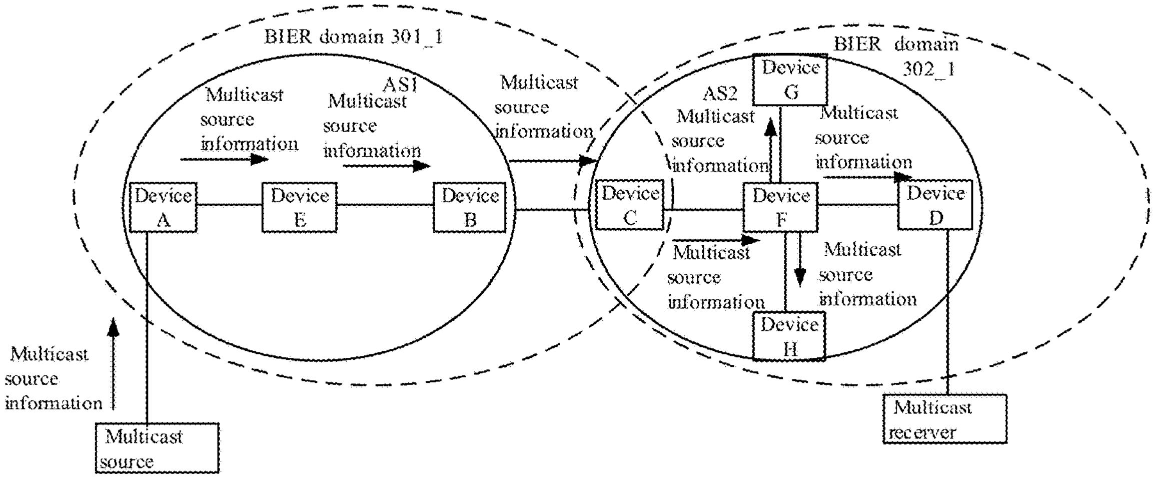
FIG. 3 is a schematic diagram illustrating an application network according to an embodiment of the present application.

The processes shown in FIG. 2 will be described below with reference to a network:

FIG. 3 is a schematic diagram illustrating an application network according to an embodiment of the present application. In the network shown in FIG. 3, device C in AS2 is deployed as both a BFER in BIER domain 301_1 and a BFIR in BIER domain 302_1. A BFR ID configured for device C serving as the BFER in BIER domain 301_1 is 10, and a BFR ID configured for device C serving as the BFIR in BIER domain 302_1 is 6. BFR IDs configured for devices D and H serving as BFERs in BIER domain 302_1 are 3 and 2 respectively. Device A serving as a BFIR in BIER domain 301_1 is connected to multicast source S. A target multicast group to which multicast source S belongs is multicast group G. Device D serving as the BFER in BIER domain 302_1 is connected to a multicast receiver.

Based on the network shown in FIG. 3, the processes shown in FIG. 2 will be exemplified below:

As shown in FIG. 3, device A, serving as the BFIR in BIER domain 301_1 connected to the multicast source, can establish a Border Gateway Protocol (BGP) route with device C based on a BGP. Afterwards, device A, when receiving multicast source information from the multicast source, may forward the multicast source information through the BGP route established with device C. Here, the multicast source information can be a packet for notifying the multicast source defined by a multicast protocol, which can carry multicast source S and multicast group G.

Device C receives the multicast source information, and device C, serving as the BFIR in BIER domain 302_1, forwards the multicast source information to all BFER devices, such as device D and device H shown in FIG. 3, in BIER domain 302_1 through BGP routes. In some examples, in this embodiment, device C, after receiving the multicast source information, may further record the multicast source information, and learn route information from device C to the multicast source (where a next hop in the route information is device A).

Device D, serving as the BFER in BIER domain 302_1, after receiving the multicast source information, may further record the multicast source information, and learn route information from device D to the multicast source (where a next hop in the route information is device C). Device H is similar. Finally, all edge nodes in BIER domain 302_1, such as device D, device H and device G may receive the multicast source information.

Afterwards, a multicast receiver connected locally to device D, if desiring to join multicast group G may send a multicast join packet, such as a (*. G) join packet, to device D.

Device D, when receiving the multicast join packet for joining multicast group G from the multicast receiver, generates a (S. G) multicast entry corresponding to multicast group G according to the recorded multicast source information.

Device D continues to send, according to the learned route information from device D to the multicast source, the multicast join packet to the next hop in the route information, that is, device C. The multicast join packet sent here can carry multicast source S, multicast group G and a BFR ID of device D.

Since device C serves as the next hop to which device D sends the multicast join packet, after device D sends the multicast join packet, device C may receive the multicast join packet from device D. Device C, when receiving the multicast join packet from device D, may establish a relationship between (multicast source S, multicast group G) and the BFR ID configured for device D serving as the BFER in BIER domain 302_1.

In this embodiment, device C determines the next hop, that is, device A serving as the BFIR in BIER domain 301_1, according to the learned route information from device C to the multicast source. Afterwards, device C modifies the BFR ID configured for device D serving as the BFER in BIER domain 302_1 carried in the multicast join packet into the BFR ID configured for device C serving as the BFER in BIER domain 301_1, and device C, serving as the BFER in BIER domain 301_1, sends the multicast join packet to the next hop, that is, device A serving as the BFIR in BIER domain 301_1. Here, the multicast join packet can carry multicast source S, multicast group G and the BFR ID configured for device C serving as the BFER in BIER domain 301_1.

Device A receives the multicast join packet from device C. and establishes a relationship between (multicast source S, multicast group G) and the BFR ID configured for device C serving as the BFER in BIER domain 301_1.

The transmission of the multicast join packet when the multicast receiver connected locally to device D desires to join multicast group G has been briefly described above.

It should be noted that, in this embodiment, if all multicast receivers connected to multiple different edge nodes (also called BFERs) in BIER domain 302_1 desire to join multicast group G according to the method for device C establishing the relationship, establishing, in BIER domain 302_1, a bitstring corresponding to (multicast source S, multicast group G) and a BIER forwarding table for reaching each BFER can be finally implemented. Here, the bitstring corresponding to (multicast source S, multicast group G) and the BIER forwarding table for reaching each BFER can be collectively referred to as BIER multicast forwarding information.

In this embodiment, specified bits in the bitstring are provided with preset values. The specified bits correspond to BFERs, such as device D, connected to multicast receivers in BIER domain 302_1, and the preset values are used to indicate that a multicast packet requires to be forwarded to the BFERs corresponding to the specified bits. Taking device D as an example, as described above, in a case where the BFR ID configured for device D serving as the BFER in BIER domain 302_1 is 3, a third bit in the bitstring is provided with a preset value, such as 1, which is used to indicate that a multicast packet requires to be forwarded to device D with the BFR ID being 3. As to the BIER forwarding table for reaching each BFER, it carries at least an egress interface, and a next-hop neighbor. In some examples, in this embodiment, the bitstring and the BIER forwarding table can be collectively referred to as BIER multicast forwarding information, which is used to indicate that multicast forwarding is performed in BIER domain 302_1.

If only the multicast receiver connected to device D in BIER domain 302_1 desires to join multicast group G the BIER multicast forwarding information here may include a forwarding table for reaching device D. and the bitstring. However, the third bit in the bitstring is provided with the preset value, such as 1, which is used to indicate that the multicast packet requires to be forwarded to device D with the BFR ID being 3, and other bits in the bitstring can be provided with an initial value, such as 0), which is used to indicate that no multicast packet is forwarded to BFERs corresponding to the bits. The BIER multicast forwarding information includes at least: a BFR ID (indicated by a bitstring) configured for a BFER (also called an edge node) connected to a multicast receiver in BIER domain 302_1, and a next-hop neighbor (indicated by forwarding) for reaching the BFER (also called an edge node).

Similarly, for device A, if all multicast receivers connected to multiple different edge nodes (also called BFERs) in BIER domain 302_1 desire to join multicast group G according to the method for device A establishing the relationship, finally, device A may establish a bitstring corresponding to (multicast source S, multicast group G) and a BIER forwarding table for reaching each BFER. As to the bitstring, its principle is as described above. For example, in a case where the BFR ID configured for device C serving as the BFER in BIER domain 301_1 is 10, a tenth bit in the bitstring is provided with a preset value, which is used to indicate that a multicast packet is forwarded to device C with the BFR ID being 10. As to the BIER forwarding table, it carries at least an egress interface, and a next-hop neighbor. Compared with the BIER multicast forwarding information established by device C, the bitstring corresponding to (multicast source S, multicast group G) and the BIER forwarding table for reaching each BFER established by device A can be referred to as a first-level BIER forwarding topology. The BIER multicast forwarding information established by device C is referred to as a second-level BIER forwarding topology.

The processes shown in FIG. 2 according to an embodiment of the present application have been exemplified above, and how to forward multicast packets according to BIER multicast forwarding information will be described below:

FIG. 4 is a flowchart illustrating another method according to an embodiment of the present application. This method is applied to a network device. As mentioned above, the network device is deployed as both a BFER in a first BIER domain and a BFIR in a second BIER domain. The first BIER domain is a BIER domain to which a first AS belongs, and the second BIER domain is a BIER domain to which a second AS belongs. The network device is located in the second AS.

As shown in FIG. 4, the method may include the following steps:

At step 401, a first multicast packet belonging to a target multicast group for being multicast forwarded in a first BIER domain is received.

In this embodiment, the first multicast packet is from a multicast source connected to a first edge node in the first AS, and the first edge node serves as a BFIR in the first BIER domain: the target multicast group is a multicast group to which the multicast source belongs.

At step 402, according to BIER multicast forwarding information corresponding to the target multicast group, the first multicast packet originally for being multicast forwarded in the first BIER domain is converted into a second multicast packet for being multicast forwarded in a second BIER domain.

In this embodiment, the BIER multicast forwarding information is, as described above, established according to a multicast join packet initiated by a multicast receiver connected to each edge node in the second BIER domain when joining the target multicast group.

In some examples, in step 402, converting, according to the BIER multicast forwarding information corresponding to the target multicast group, the first multicast packet originally for being multicast forwarded in the first BIER domain into the second multicast packet for being multicast forwarded in the second BIER domain includes: restoring an original multicast packet from the first multicast packet:

in a case where it is determined that the BIER multicast forwarding information corresponding to the target multicast group carried in the original multicast packet has been established, converting, according to the BIER multicast forwarding information, the original multicast packet into the second multicast packet for being multicast forwarded in the second BIER domain.

In this embodiment, the first multicast packet is a multicast packet received by the network device serving as the BFER in the first BIER domain. The first multicast packet carries first encapsulation information for being forwarded in the first BIER domain. As to the first encapsulation information carried in the first multicast packet, its details will be exemplified below, and will not be repeated here.

Based on this, restoring the original multicast packet from the first multicast packet may include: decapsulating the first encapsulation information for being forwarded in the first BIER domain carried in the first multicast packet to obtain the original multicast packet.

In addition, in this embodiment, there are many implementation manners for converting, according to the BIER multicast forwarding information, the original multicast packet into the second multicast packet for being multicast forwarded in the second BIER domain, for example, encapsulating, according to the BIER multicast forwarding information, second encapsulation information for being multicast forwarded in the second BIER domain in the original multicast packet to obtain the second multicast packet. As to the second encapsulation information, it will be exemplified below; and will not be repeated here.

At step 403, the second multicast packet is forwarded in the second BIER domain.

In some examples, in this embodiment, the second encapsulation information carries at least a bitstring. Specified bits in the bitstring are provided with preset values. Here, the specified bits correspond to edge nodes connected to multicast receivers in the second BIER domain, and the preset values are used to indicate that the second multicast packet requires to be forwarded to the edge nodes corresponding to the specified bits. Finally, through steps 401 to 403, multicast packets from AS1 are multicast forwarded in AS2 across ASs.

As can be seen from processes shown in FIG. 4, in this embodiment, hierarchical BIER, that is, a BFER in a first BIER domain and a BFIR in a second BIER domain, is deployed on an ASBR in an AS, and the ASBR establishes, according to a multicast join packet initiated by a multicast receiver connected to an edge node in a second AS. BIER multicast forwarding information for being multicast forwarded in the second BIER domain, so as to convert a multicast packet from the first BIER domain and forward the converted multicast packet in the second BIER domain, which solves the problem that occurs during the multicast forwarding across ASs due to BFR ID conflicts in different BIER domains.

Further, in this embodiment, multicast forwarding across ASs can be implemented merely by simply modifying or upgrading an ASBR in an AS, which has no impact on original multicast services or other devices, and makes it easy to expand.

The processes shown in FIG. 4 will be exemplified below with reference to FIG. 5:

Still taking the network shown in FIG. 3 as an example, as shown in FIG. 5, device A, serving as a BFIR connected to a multicast source in BIER domain 301_1, receives an original multicast packet (denoted as packet 501) belonging to multicast group G from the multicast source.

Device A performs outer layer IPv6 encapsulation on packet 501 according to a first-level BIER forwarding topology. For convenience of description, encapsulated packet 501 can be denoted as packet 502.

In some examples, in this embodiment, the outer layer IPv6 encapsulation includes an IPv6 basic encapsulation header, and IPv6 extension encapsulation headers(also referred to as Extension Headers). FIG. 6 illustrates an IPv6 basic encapsulation header. As shown in FIG. 6, the IPv6 basic encapsulation header includes at least a source IPv6 address, and a destination IPv6 address, where the source IPv6 address is an address of device A. and the destination IPv6 address is an address of a next-hop BFR neighbor, such as device E.

As to the IPv6 extension encapsulation headers, they can include at least: a Destination Option Header (DOH). A BIER packet header is an option of the DOH. In this embodiment, the BIER packet header is used to carry a bitstring corresponding to (multicast source S, multicast group G) established in BIER domain 301_1. A tenth bit in the bitstring is provided with a preset value, which is used to indicate that a multicast packet is forwarded to device C with a BFR ID being 10.

Device A forwards packet 502. Device E and device B, serving as intermediate devices, may forward packet 502 to device C according to the bitstring in the BIER packet header and a BIER forwarding table. In some examples, in an example, device E, when receiving packet 502, may modify a destination IPv6 address of packet 502 into an IP address of a next hop, that is, device B. and then continue to forward packet 502 according to the existing packet forwarding method. Similarly, device B, when receiving packet 502, may modify a destination IPv6 address of packet 502 into an IP address of a next hop, that is, device C. and then continue to forward packet 502 according to the existing packet forwarding method.

Device C receives packet 502. Here, the outer layer IPv6 encapsulation carried in packet 502 is first encapsulation information.

Device C determines that the device is a BFER according to a bitstring in packet 502, and then decapsulates packet 502 to restore the original multicast packet, that is, packet 501. In some examples, in this embodiment, device C can perform an AND operation on the bitstring in packet 502 and a Forwarding BitMask (FBM) in an established BIER forwarding table for being multicast forwarded in BIER domain 301_1 to obtain an operation result. The FBM is found from the BIER forwarding table as a next-hop neighbor (NBR) of the operation result. If the NBR is device C, it is determined that the device is a BFER of packet 502. Here, the BIER forwarding table can be established according to the existing BIER forwarding table establishing method, which will not be further described here.

Afterwards, device C determines a second-level BIER forwarding topology corresponding to multicast group G according to multicast group G carried in packet 501. Device C performs outer layer IPv6 encapsulation on packet 501 according to the second-level BIER forwarding topology. For convenience of description, an encapsulated packet 501 can be denoted as packet 503. Here, the outer layer IPv6 encapsulation carried in packet 503 is second encapsulation information.

Similarly, in this embodiment, the outer layer IPv6 encapsulation includes an IPv6 basic encapsulation header, and IPv6 extension encapsulation headers. The IPv6 basic encapsulation header includes at least a source IPv6 address, and a destination IPv6 address, where the source IPv6 address is an address of device C. and the destination IPv6 address is an address of a next-hop BFR neighbor, such as device F. As to the IPv6 extension encapsulation headers, they can include at least: a DOH. A BIER packet header is an option of the DOH. In this embodiment, the BIER packet header is used to carry a bitstring corresponding to (multicast source S, multicast group G) established in BIER domain 302_1. A second bit in the bitstring is provided with a preset value, which is used to indicate that a multicast packet is forwarded to device D with a BFR ID being 2.

Device C forwards packet 503. As can be seen, device C, before forwarding packet 503 in BIER domain 302_1, may first decapsulate packet 502 from BIER domain 301_1 to restore the original multicast packet, that is, packet 501, and then perform outer layer IPv6 encapsulation on packet 501 based on a second-level BIER forwarding topology in BIER domain 302_1 to obtain packet 503. In this way, even if BFR ID conflicts occur in BIER domain 301_1 and BIER domain 302_1, device C, before forwarding packet 503 in BIER domain 302_1, has decapsulated packet 502 from BIER domain 301_1 to restore the original multicast packet, that is, packet 501, which obviously has no impact on forwarding of packet 503 in BIER domain 302_1.

Device F, serving as an intermediate device, may forward packet 503 to device D according to the bitstring in the BIER packet header and a BIER forwarding table. In some examples, in an example, device F, when receiving packet 503, may modify a destination IPv6 address of packet 503 into an IP address of a next hop, that is, device D. and then continue to forward packet 503 according to the existing packet forwarding method.

Device D receives packet 503. Device D determines that the device is a BFER according to a bitstring in packet 503, and then decapsulates packet 503 to restore the original multicast packet, that is, packet 501.

Device D sends packet 501 to a multicast receiver. Finally, forwarding of multicast packets across BIER domains is implemented.

As can be seen from the above description, in this embodiment, by deploying different identities in different BIER domains on an ASBR in an AS, for example, deploying a BFER in BIER domain 301_1 and a BFIR in BIER domain 302_1, the ASBR, serving as the BFER in BIER domain 301_1, receives a multicast packet in BIER domain 301_1, and converts the multicast packet into a multicast packet that can be forwarded in BIER domain 302_1, then serving as the BFIR in BIER domain 302_1, forwards the converted multicast packet in BIER domain 302_1, which solves the problem that occurs during the multicast forwarding across ASs due to BFR ID conflicts in different BIER domains.

Figure 7:
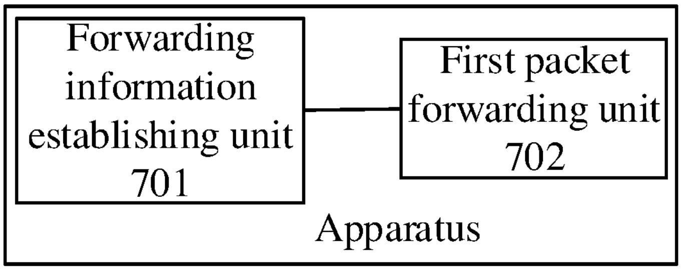
FIG. 7 is a structural diagram illustrating an apparatus according to an embodiment of the present application.

The methods according to the embodiments of the present application have been described above, and apparatuses according to the embodiments of the present application will be described below:

FIG. 7 is a structural diagram illustrating an apparatus according to an embodiment of the present application. The apparatus corresponds to the processes shown in FIG. 2. The apparatus is applied to a network device. The network device is deployed as both a BFER in a first BIER domain and a BFIR in a second BIER domain. The first BIER domain is a BIER domain to which a first AS belongs, and the second BIER domain is a BIER domain to which a second AS belongs. The network device is located in the second AS. The apparatus includes:

a forwarding information establishing unit 701, configured to establish, according to a multicast join packet initiated by a multicast receiver, BIER multicast forwarding information for being multicast forwarded in the second BIER domain, where the multicast receiver is connected to a second edge node in the second AS, the second edge node serves as a BFER in the second BIER domain, the multicast join packet is used to join a target multicast group, the target multicast group is a multicast group to which a multicast source connected to a first edge node in the first AS belongs, and the first edge node serves as a BFIR in the first BIER domain;

a first packet forwarding unit 702, configured to modify a Bit Forwarding Router Identifier (BFR ID) of the second edge node carried in the multicast join packet into a first BFR ID, and continue to send the multicast join packet to the first edge node, where the first BFR ID is a BFR ID configured when the network device is deployed as the BFER in the first BIER domain.

In some examples, in this embodiment, the forwarding information establishing unit is further configured to receive multicast source information from the multicast source, and forward the multicast source information in the second BIER domain.

In some examples, receiving the multicast source information from the multicast source includes: receiving the multicast source information from the multicast source through a first BGP route, where the first BGP route is a BGP route between the network device and a first node device; and/or forwarding the multicast source information in the second BIER domain includes: forwarding the multicast source information in the second BIER domain through a second BGP route, where the second BGP route includes: a BGP route between the network device and at least one edge node in the second BIER domain.

In some examples, the BIER multicast forwarding information corresponds to the target multicast group, and includes at least:

the BFR ID of the second edge node, and a next-hop neighbor for reaching the second edge node.

So far, the description for a structure of the apparatus shown in FIG. 7 is completed.

Figure 8:
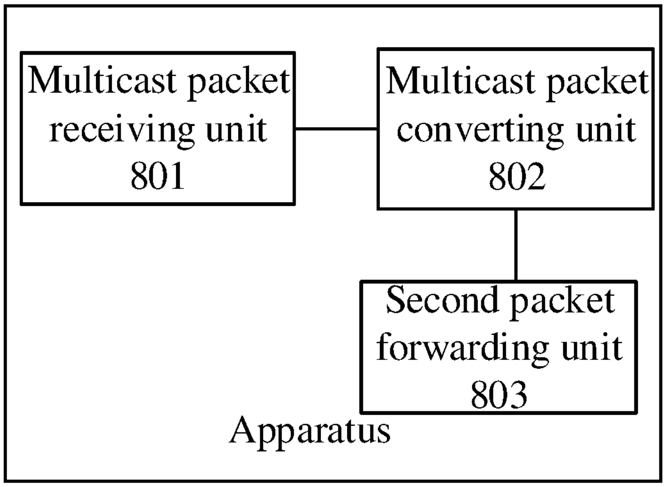
FIG. 8 is a structural diagram illustrating another apparatus according to an embodiment of the present application.

In the embodiments of the present application, there is further provided another apparatus. FIG. 8 is a structural diagram illustrating another apparatus according to an embodiment of the present application. The apparatus corresponds to the processes shown in FIG. 4. The apparatus is applied to a network device. The network device is deployed as both a BFER in a first BIER domain and a BFIR in a second BIER domain. The first BIER domain is a BIER domain to which a first AS belongs, and the second BIER domain is a BIER domain to which a second AS belongs. The network device is located in the second AS. The apparatus includes:

a multicast packet receiving unit 801, configured to receive a first multicast packet belonging to a target multicast group for being multicast forwarded in the first BIER domain, where the first multicast packet is from a multicast source connected to a first edge node in the first AS, the first edge node serves as a BFIR in the first BIER domain, and the target multicast group is a multicast group to which the multicast source belongs;

a multicast packet converting unit 802, configured to convert, according to BIER multicast forwarding information corresponding to the target multicast group, the first multicast packet originally for being multicast forwarded in the first BIER domain into a second multicast packet for being multicast forwarded in the second BIER domain, where the BIER multicast forwarding information is established according to a multicast join packet initiated by a multicast receiver connected to each edge node in the second BIER domain when joining the target multicast group;

a second packet forwarding unit 803, configured to forward the second multicast packet in the second BIER domain.

In some examples, converting, according to the BIER multicast forwarding information corresponding to the target multicast group, the first multicast packet originally for being multicast forwarded in the first BIER domain into the second multicast packet for being multicast forwarded in the second BIER domain includes:

restoring an original multicast packet from the first multicast packet;

in a case where it is determined that the BIER multicast forwarding information corresponding to the target multicast group carried in the original multicast packet has been established, converting, according to the BIER multicast forwarding information, the original multicast packet into the second multicast packet for being multicast forwarded in the second BIER domain.

In some examples, the first multicast packet carries first encapsulation information for being forwarded in the first BIER domain:

restoring the original multicast packet from the first multicast packet includes;

decapsulating the first encapsulation information carried in the first multicast packet to obtain the original multicast packet.

In some examples, converting, according to the BIER multicast forwarding information, the original multicast packet into the second multicast packet for being multicast forwarded in the second BIER domain includes:

encapsulating second encapsulation information for being multicast forwarded in the second BIER domain on an outer layer of the original multicast packet to obtain the second multicast packet, where the second multicast packet carries at least a bitstring, specified bits in the bitstring are provided with preset values, the specified bits correspond to edge nodes connected to multicast receivers in the second BIER domain, and the preset values are used to indicate that the second multicast packet requires to be forwarded to the edge nodes corresponding to the specified bits.

So far, the description for a structure of the apparatus shown in FIG. 8 is completed.

As can be seen from the above technical solutions, in the present application, by deploying hierarchical BIER, that is, a BFER in a first BIER domain and a BFIR in a second BIER domain, on an ASBR in an AS, the ASBR converts a multicast packet from the first BIER domain and forwards the converted multicast packet in the second BIER domain, which solves the problem that occurs during the multicast forwarding across ASs due to BFR ID conflicts in different BIER domains.

Figure 9:
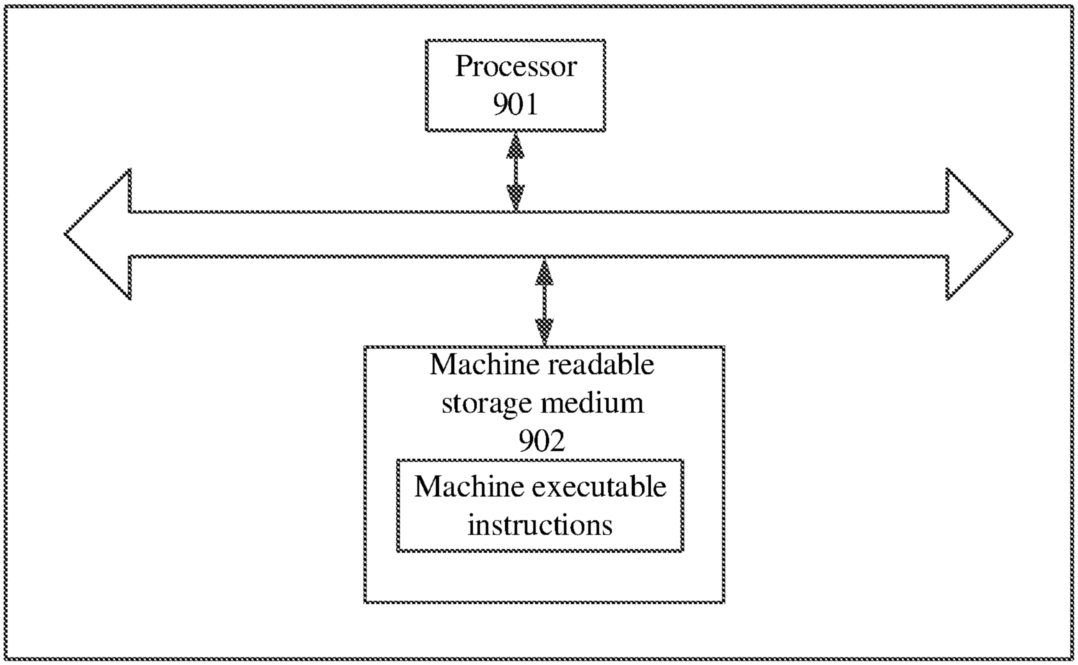
FIG. 9 is a structural diagram illustrating an electronic device according to an embodiment of the present application.

In the embodiments of the present application, there is further provided a hardware structure of the apparatus shown in FIG. 7 or FIG. 8. FIG. 9 is a structural diagram illustrating an electronic device according to an embodiment of the present application. As shown in FIG. 9, the hardware structure may include: a processor 901 and a machine readable storage medium 902, where the machine readable storage medium stores machine executable instructions executable by the processor; the processor is configured to execute the machine executable instructions to implement the method disclosed in the embodiments of the present application.

Based on the same application concept as the above-mentioned method, an embodiment of the present application provides a machine readable storage medium, where several computer instructions are stored on the machine readable storage medium, and when the computer instructions are executed by a processor, the method disclosed in the embodiments of the present application can be implemented.

In some examples, the machine readable storage medium may be any electronic, magnetic, optical, or other physical storage apparatus, and may contain or store information, such as executable instructions, and data. For example, the machine readable storage medium may be: a Radom Access Memory (RAM for short), a volatile memory, a non-volatile memory: a flash memory, a storage drive (such as hard drive), a solid state hard disk, any type of storage disk (such as optical discs, and Digital Video Disks (DVDs for short)), or similar storage medium, or a combination of them.

The system, apparatus, module or unit set forth in the above examples may be specifically implemented by a computer chip or an entity, or implemented by a product having a certain function. A typical implementation device is a computer, and a specific form of the computer may be a personal computer, a laptop computer, a cellular phone, a camera phone, a smart phone, a personal digital assistant, a media player, a navigation device, an e-mail transceiver device, a game console, a tablet computer, a wearable device, or a combination of any of these devices.

For the convenience of description, during the description of the apparatus, it is divided into various units according to their functions, which are described respectively. When the present application is implemented, functions of each unit may be realized in one or more software and/or hardware.

Those skilled in the art should understand that the embodiments of the present application may be provided as methods, systems, or computer program products. Accordingly: the present application may take the form of a pure hardware embodiment, a pure software embodiment, or an embodiment combining software and hardware aspects. Furthermore, the embodiments of the present application may take the form of a computer program product implemented on one or more computer usable storage media (including, but not limited to, disk storage. Compact Disc Read-Only Memory (CD-ROM for short), optical storage, etc.) having computer usable program codes therein.

The present application is described with reference to flowcharts and/or block diagrams illustrating methods, apparatuses (or systems), and computer program products according to the embodiments of the present application. It should be understood that each process and/or block, and combinations of processes and/or blocks in the flowcharts and/or block diagrams can be implemented by computer program instructions. These computer program instructions may be provided to a processor of a general-purpose computer, a special-purpose computer, an embedded processing machine or other programmable data processing device to produce a machine, so that the instructions executed by the processor of the computer or other programmable data processing device produce an apparatus for realizing functions specified in one or more processes in a flowchart and/or one or more blocks in a block diagram.

Furthermore, these computer program instructions may be stored in a computer readable memory capable of directing a computer or other programmable data processing device to operate in a particular manner, so that the instructions stored in the computer readable memory produce a product including an instruction device. The instruction device can realize functions specified in one or more processes in a flowchart and/or one or more blocks in a block diagram.

These computer program instructions may be loaded on a computer or other programmable data processing device, so that a series of operation steps are performed on the computer or other programmable device to produce processes implemented by a computer, and the instructions executed on the computer or other programmable device provide steps for realizing functions specified in one or more processes in a flowchart and/or one or more blocks in a block diagram.

The above are only embodiments of the present application, which are not intended to limit the present application. For those skilled in the art, various modifications and variations can be made to the application. Any modification, equivalent replacement, improvement, etc. made within the spirit and principle of the present application shall fall into the scope of the claims of the present application.

The invention claimed is:

1. A multicast forwarding method across Autonomous Systems (ASs), wherein the method is applied to a network device, the network device is deployed as both a Bit Forwarding Egress Router (BFER) in a first Bit Indexed Explicit Replication (BIER) domain and a Bit Forwarding Ingress Router (BFIR) in a second BIER domain, the first BIER domain is a BIER domain to which a first AS belongs, the second BIER domain is a BIER domain to which a second AS belongs, and the network device is located in the second AS; the method comprises:

establishing, according to a multicast join packet initiated by a multicast receiver, BIER multicast forwarding information for being multicast forwarded in the second BIER domain, wherein the multicast receiver is connected to a second edge node in the second AS, the second edge node serves as a BFER in the second BIER domain, the multicast join packet is used to join a target multicast group, the target multicast group is a multicast group to which a multicast source connected to a first edge node in the first AS belongs, and the first edge node serves as a BFIR in the first BIER domain; and modifying a Bit Forwarding Router Identifier (BFR ID) of the second edge node carried in the multicast join packet into a first BFR ID, and continuing to send the multicast join packet to the first edge node, wherein the first BFR ID is a BFR ID configured when the network device is deployed as the BFER in the first BIER domain.

2. The method according to claim 1, further comprising:

receiving multicast source information from the multicast source; and forwarding the multicast source information in the second BIER domain.

3. The method according to claim 2, wherein receiving the multicast source information from the multicast source comprises: receiving the multicast source information from the multicast source through a first Border Gateway Protocol (BGP) route, wherein the first BGP route is a BGP route between the network device and the first edge node; and/or forwarding the multicast source information in the second BIER domain comprises: forwarding the multicast source information in the second BIER domain through a second BGP route, wherein the second BGP route comprises: a BGP route between the network device and at least one edge node in the second BIER domain.

4. The method according to claim 1, wherein the BIER multicast forwarding information corresponds to the target multicast group, and comprises at least:

the BFR ID of the second edge node, and a next-hop neighbor for reaching the second edge node.

5. A multicast forwarding method across Autonomous Systems (ASs), wherein the method is applied to a network device, the network device is deployed as both a Bit Forwarding Egress Router (BFER) in a first Bit Indexed Explicit Replication (BIER) domain and a Bit Forwarding Ingress Router (BFIR) in a second BIER domain, the first BIER domain is a BIER domain to which a first AS belongs, the second BIER domain is a BIER domain to which a second AS belongs, and the network device is located in the second AS; the method comprises:

receiving a first multicast packet belonging to a target multicast group for being multicast forwarded in the first BIER domain, wherein the first multicast packet is from a multicast source connected to a first edge node in the first AS, the first edge node serves as a BFIR in the first BIER domain, and the target multicast group is a multicast group to which the multicast source belongs;

converting, according to BIER multicast forwarding information corresponding to the target multicast group, the first multicast packet originally for being multicast forwarded in the first BIER domain into a second multicast packet for being multicast forwarded in the second BIER domain, wherein the BIER multicast forwarding information is established according to a multicast join packet initiated by a multicast receiver connected to each edge node in the second BIER domain when joining the target multicast group; and forwarding the second multicast packet in the second BIER domain.

6. The method according to claim 5, wherein converting, according to the BIER multicast forwarding information corresponding to the target multicast group, the first multicast packet originally for being multicast forwarded in the first BIER domain into the second multicast packet for being multicast forwarded in the second BIER domain comprises:

restoring an original multicast packet from the first multicast packet; and in a case where it is determined that the BIER multicast forwarding information corresponding to the target multicast group carried in the original multicast packet has been established, converting, according to the BIER multicast forwarding information, the original multicast packet into the second multicast packet for being multicast forwarded in the second BIER domain.

7. The method according to claim 6, wherein the first multicast packet carries first encapsulation information for being forwarded in the first BIER domain;

restoring the original multicast packet from the first multicast packet comprises:

decapsulating the first encapsulation information carried in the first multicast packet to obtain the original multicast packet.

8. The method according to claim 6, wherein converting, according to the BIER multicast forwarding information, the original multicast packet into the second multicast packet for being multicast forwarded in the second BIER domain comprises:

encapsulating second encapsulation information for being multicast forwarded in the second BIER domain on an outer layer of the original multicast packet to obtain the second multicast packet, wherein the second multicast packet carries at least a bitstring, specified bits in the bitstring are provided with preset values, the specified bits correspond to edge nodes connected to multicast receivers in the second BIER domain, and the preset values are used to indicate that the second multicast packet requires to be forwarded to the edge nodes corresponding to the specified bits.

9. A multicast forwarding apparatus across Autonomous Systems (ASs), wherein the apparatus is applied to a network device, the network device is deployed as both a Bit Forwarding Egress Router (BFER) in a first Bit Indexed Explicit Replication (BIER) domain and a Bit Forwarding Ingress Router (BFIR) in a second BIER domain, the first BIER domain is a BIER domain to which a first AS belongs, the second BIER domain is a BIER domain to which a second AS belongs, and the network device is located in the second AS; the apparatus comprises:

at least one processor;

at least one non-transitory storage medium storing machine-executable instructions for execution by the at least one processor to perform operations comprising:

establishing, according to a multicast join packet initiated by a multicast receiver, BIER multicast forwarding information for being multicast forwarded in the second BIER domain, wherein the multicast receiver is connected to a second edge node in the second AS, the second edge node serves as a BFER in the second BIER domain, the multicast join packet is used to join a target multicast group, the target multicast group is a multicast group to which a multicast source connected to a first edge node in the first AS belongs, and the first edge node serves as a BFIR in the first BIER domain; and modifying a Bit Forwarding Router Identifier (BFR ID) of the second edge node carried in the multicast join packet into a first BFR ID, and continue to send the multicast join packet to the first edge node, wherein the first BFR ID is a BFR ID configured when the network device is deployed as the BFER in the first BIER domain.

10. A multicast forwarding apparatus across Autonomous Systems (ASs), wherein the apparatus is applied to a network device, the network device is deployed as both a Bit Forwarding Egress Router (BFER) in a first Bit Indexed Explicit Replication (BIER) domain and a Bit Forwarding Ingress Router (BFIR) in a second BIER domain, the first BIER domain is a BIER domain to which a first AS belongs, the second BIER domain is a BIER domain to which a second AS belongs, and the network device is located in the second AS; the apparatus comprises:

at least one processor; and at least one non-transitory storage medium storing machine-executable instructions for execution by the at least one processor to perform the method according to claim 5.

11. The apparatus according to claim 9, wherein the operations further comprise:

receiving multicast source information from the multicast source; and forwarding the multicast source information in the second BIER domain.

12. The apparatus according to claim 11, wherein receiving the multicast source information from the multicast source comprises: receiving the multicast source information from the multicast source through a first Border Gateway Protocol (BGP) route, wherein the first BGP route is a BGP route between the network device and the first edge node; and/or forwarding the multicast source information in the second BIER domain comprises: forwarding the multicast source information in the second BIER domain through a second BGP route, wherein the second BGP route comprises: a BGP route between the network device and at least one edge node in the second BIER domain.

13. The apparatus according to claim 9, wherein the BIER multicast forwarding information corresponds to the target multicast group, and comprises at least:

the BFR ID of the second edge node, and a next-hop neighbor for reaching the second edge node.

* * * * *